Nov. 7, 1950   H. CHIREIX   2,529,073
POWER AMPLIFICATION SYSTEM FOR VERY SHORT WAVES
Filed Aug. 2, 1946   2 Sheets-Sheet 1

Inventor
HENRI CHIREIX
By Haseltine Lake & Co.
Attorneys

Nov. 7, 1950            H. CHIREIX            2,529,073
POWER AMPLIFICATION SYSTEM FOR VERY SHORT WAVES
Filed Aug. 2, 1946            2 Sheets—Sheet 2
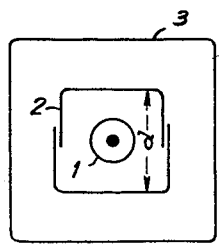
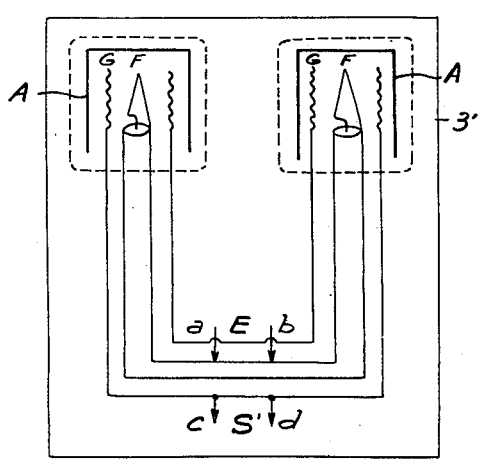
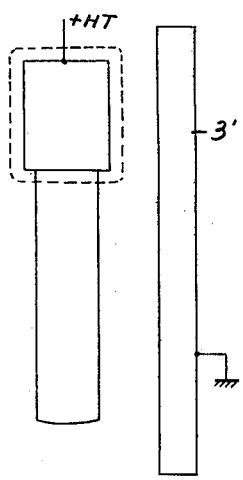
Inventor
HENRI CHIREIX
By Haseltine, Lake & Co.
Attorneys

Patented Nov. 7, 1950

2,529,073

UNITED STATES PATENT OFFICE 2,529,073

POWER AMPLIFICATION SYSTEM FOR VERY SHORT WAVES

Henri Chireix, Paris, France, assignor to Societe Francaise Radio-Electrique, a corporation of France Application August 2, 1946, Serial No. 688,150
In France October 25, 1944

Section 1, Public Law 690, August 8, 1946
Patent expires October 25, 1964

5 Claims. (Cl. 179—171)

This invention relates to power amplifier circuit arrangements for ultra-short waves and the object of the present invention is to provide an improved circuit system intended for the power amplification of ultra-short waves and is intended principally for use in the field of transmitters of waves of the order of a metre and of wide pass bands.

Amplification circuits are known employing triode valves in which in order to avoid the parasitic capacity of the anode with respect to earth (which capacity may be considerable in valves with an anode cooled by water or by forced air) the anode is earthed from the point of view of the very high frequency, the filament and the grid being then simultaneously carried to a high potential frequency with respect to earth.

Furthermore, connections termed by cathodic excitation are known in which the high frequency excitation is introduced between cathode and earth, the grid of the valve being itself earthed. It is known that such an arrangement requires no additional neutralisation capacity if the internal cathode anode capacity is negligible, but the anode being carried to high frequency high potential, the anode-earth capacity becomes placed in parallel with the anode-grid capacity and consequently will increase by so much the output capacity.

The invention has more particularly for its object a circuit in which the advantages of the cathodic excitation arrangement are retained, whilst keeping the anode at a zero high frequency potential in such manner that the anode-earth capacity does not intervene.

The invention will be more particularly described with reference to Figures 1 and 2 of the accompanying drawings, in which for greater simplicity, the direct current circuits have been omitted.

Figure 1:
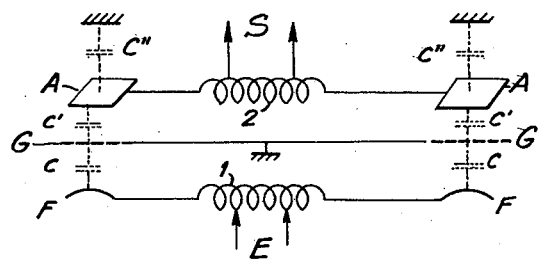

Figure 1 refers to the known arrangement with cathodic excitation, in a circuit using two triodes mounted symmetrically. The filaments F are connected together by an inductance 1 and the anodes A by an inductance 2. The excitation of the amplifier stage is represented at E, whereas the useful energy is taken off at S. The tuning capacity of the input circuit comprises the two grid-filament capacities in series C shown diagrammatically in fine dotted lines and the tuning capacity of the output circuit comprises the two anode-grid capacities C' being also shown diagrammatically in fine dotted lines; to these there are added the two anode-earth capacities shown diagrammatically by C''.

Figure 2:
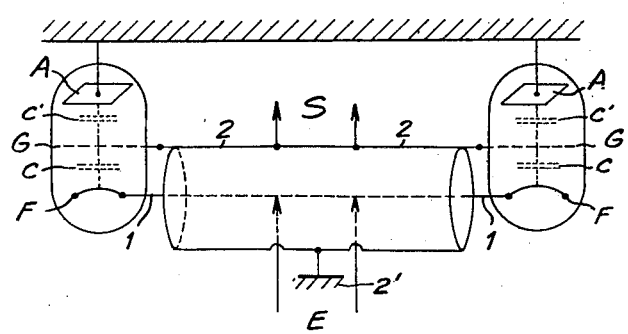

Figure 2 represents the arrangement according to the present invention. The self-induction 2 of the output circuit is connected between grids and is preferably constituted by the outer envelope of a tubular feeder; the anodes are themselves earthed at 3 for the high frequency by means of capacitors (not shown). The self-induction 1 of the input circuit is coupled to the self-inductance 2 of the output circuit by mutual induction with a coefficient of coupling nearly equal to unity, that is to say, without appreciable losses.

Under these conditions, all excitation potential developed at E on the interior conductor of the feeder cannot develop any potential on the exterior envelope and the latter remains with respect to the excitation potential, at earth potential if it is placed at this potential in its center. Thus, there are produced, with respect to the excitation potential, the conditions of Figure 1, and the arrangement is in particular neutrodyned if the internal capacity of filament-plate can be neglected.

As regards the relay effect, the output potential will be manifested on the outer envelope of the feeder and owing to the inductive coupling the same potential will be found on the inner conductor of the feeder, so that the potential between grid and filament is not altered. The useful voltage is taken at S from the external envelope 2. The tuning capacity of the input circuit is constituted by the two grid-filament capacities C in series and the tuning capacity of the output circuit by the two grid-anode capacities C' in series. The two circuits having the same geometric length it is necessary in order that they may be tuned to the same frequency that the characteristic impedance of the feeder constituted by 1 and 2 and of the feeder constituted by the tube 2 and the earth 2' should be in the ratio of the external grid-anode, grid-filament capacities. The anode-earth capacity does not interfere since the anodes are earthed from the point of view of high frequency.

Figure 3:
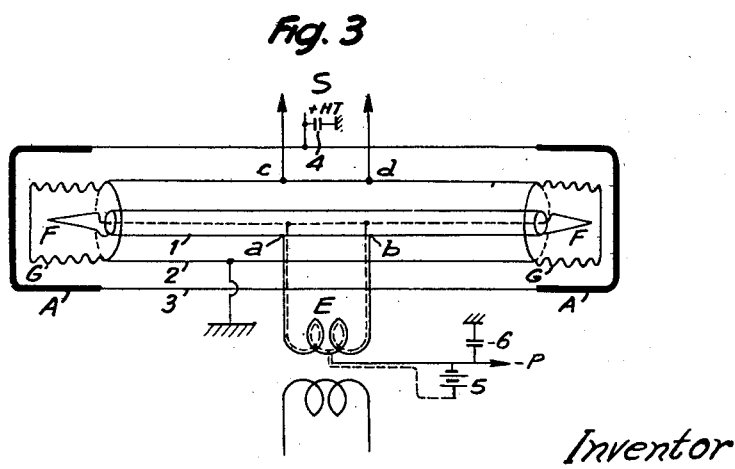

Figure 3 indicates by way of example only the practical embodiment of a device according to the present invention. The two valves of the symmetrical arrangement are mounted at the extremities of a coaxial whole comprising three concentric valves; the length may be adjustable by forming the whole in a sliding form. The inner valve 1 is connected to the filaments F and receive the cathodic excitation by the adjustable tappings $a$ and $b$. The central tube 2 is connected to the grids C and the output S is connected to the adjustable tappings $c$ and $d$. Finally, the envelope 3 is earthed from the point of view of high frequency, that is to say, that it is in fact connected to the high tension source shown by HT (Figure 3), the capacity 4 playing the part of a short circuit from the high frequency point of view. The source of heating for the filaments is represented at 5 and —P indicates the continuous grid bias. Finally, 6 is a condenser also playing the part of a short circuit from the high frequency point of view.

As stated above, the characteristic impedance of the tubes 1—2 on the one hand, and 2—3 on the other hand, must be in the ratio of the internal grid-anode, grid-filament capacities whereupon means for tuning regulation may be provided for this purpose. Thus, for example, in a modification illustrated in Figure 5, which gives a view in section, 1 is shaped in the form of a coaxial feeder, whereas 2 is constituted by two half shells and 3 has a square section; 1 and 3 remaining fixed, the distance d may be adjusted by displacement of the two half shells, the whole unit 2 remaining concentric with 1 and 3; when d increases, the characteristic impedance of the system 1—2 increases, whereas that of the system 2—3 diminishes. Thus, means are given for regulating the ratio of the characteristic impedances.

It will be noted that the whole thus constituted is completely screened and consequently does not radiate energy; the high frequency losses are thus a minimum for they are reduced to the losses in the coaxial feeders.

Instead of developing the whole in a rectilinear direction as indicated by Figure 3, it would be possible to impart any other suitable form to the circuit and in particular the form of a U (Figure 5a) which would have the effect of placing the two valves side by side. In this latter case, the screening 3 (Figure 3) could be omitted and for example replaced by a metal sheet 3' (Figures 5a and 5b) supporting the whole, parallel to the plane of the U and attached to the latter. The characteristic impedance to be taken into consideration for the output circuit would then be that of the double feeder constituted by the two branches of the U, an impedance itself modified by the proximity of the plate 3'. By making the distance of the plate to the U adjustable, the characteristic impedance of the output circuit would be modified. In this latter form, the losses by radiation may no longer be negligible.

It will be noted that the arrangement according to the present invention by reducing the capacities to the utmost permits of embodying amplifiers with a very wide passband and for very short waves. It is equally clear that several identical entities may be associated in parallel to increase the output power and, conversely, according to the same principle, an amplifier stage may be constituted having a single valve.

What I claim is:
1. In a short wave amplifier, a thermionic tube having anode, cathode and grid electrodes, means for grounding said anode electrode for high frequency voltages, two inductances one entirely surrounding the other and coupled therebetween inductively with a coefficient of coupling substantially equal to unity, these outer and inner inductances having adjacent terminals connected respectively to said grid and cathode electrodes, means for grounding the other terminals of said two inductances at least for high frequency voltages, means for applying high frequency input voltages on the said inner inductance and means for picking up high frequency output voltages on the said outer inductance.

2. A short wave amplifier as described in Claim 1, including a tubular feeder, and wherein the said inner and outer inductances are constituted respectively by the inner and outer conductors of said tubular feeder.

3. In a short wave amplifier, a pair of thermionic tubes having anode, cathode and grid electrodes, means for grounding said anode electrodes for high frequency voltages, two inductances one entirely surrounding the other and coupled therebetween inductively with a coefficient of coupling substantially equal to unity, the outer inductance being coupled between the grids and the inner inductance between the cathodes of said tubes, means for grounding the midpoints of each inductance at least for high frequency voltages, means for applying high frequency input voltages in phase opposition between two points of said inner inductance and ground and means for picking up high frequency output voltages in phase opposition between two points of said outer inductance and ground.

4. A short wave amplifier as described in claim 3, including a tubular feeder and wherein the said inner and outer inductances are constituted respectively by the inner and outer conductors of said tubular feeder.

5. A short wave amplifier as described in claim 3, including a tubular feeder, and wherein the said inner and outer inductances are constituted respectively by the inner and outer conductors of said tubular feeder, and a further tubular conductor, entirely surrounding the said feeder, is connected between the anode electrodes of the said two tubes.

HENRI CHIREIX.

REFERENCES CITED

The following references are of record in the file of this patent:

UNITED STATES PATENTS

| Number | Name | Date |
|---|---|---|
| 2,252,458 | Conklin | Aug. 12, 1941 |
| 2,421,784 | Haeseler | June 10, 1947 |
| 2,429,760 | Hotine | Oct. 28, 1947 |